Oct. 1, 1957    R. W. WENGEL    2,808,259
CONTINUOUS FILM LOOP HOLDER FOR REPEATING PROJECTORS
Filed June 10, 1953    8 Sheets-Sheet 1
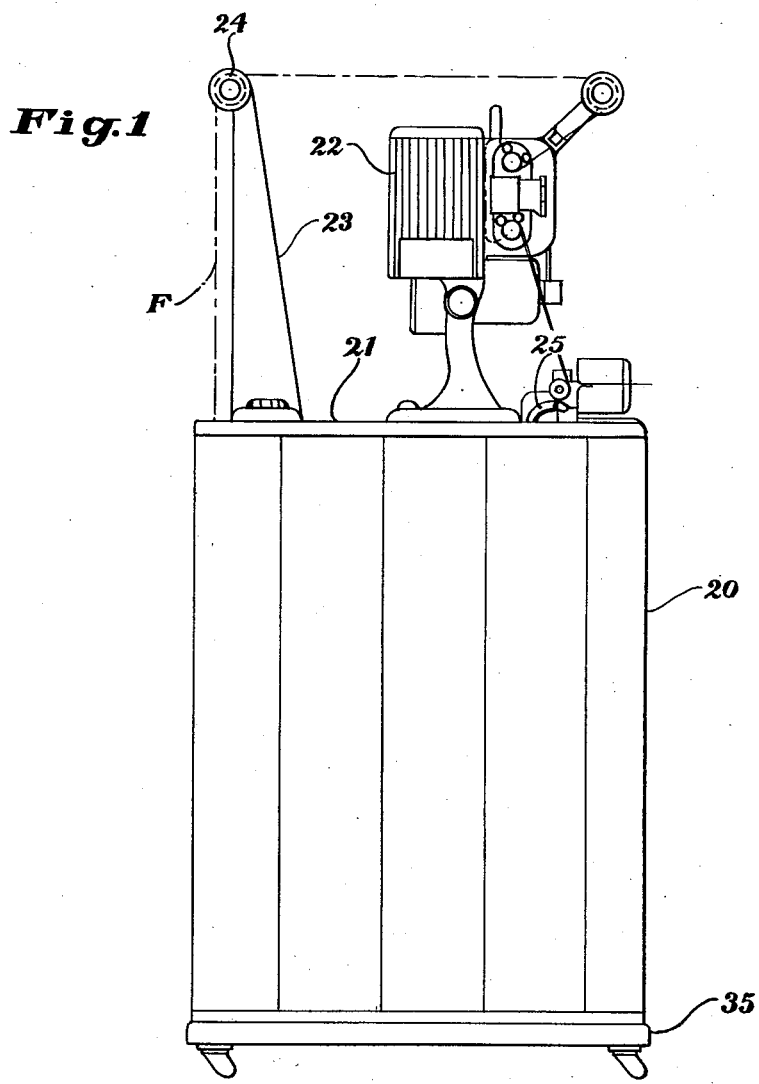
Raymond W. Wengel
INVENTOR.
ATTORNEYS

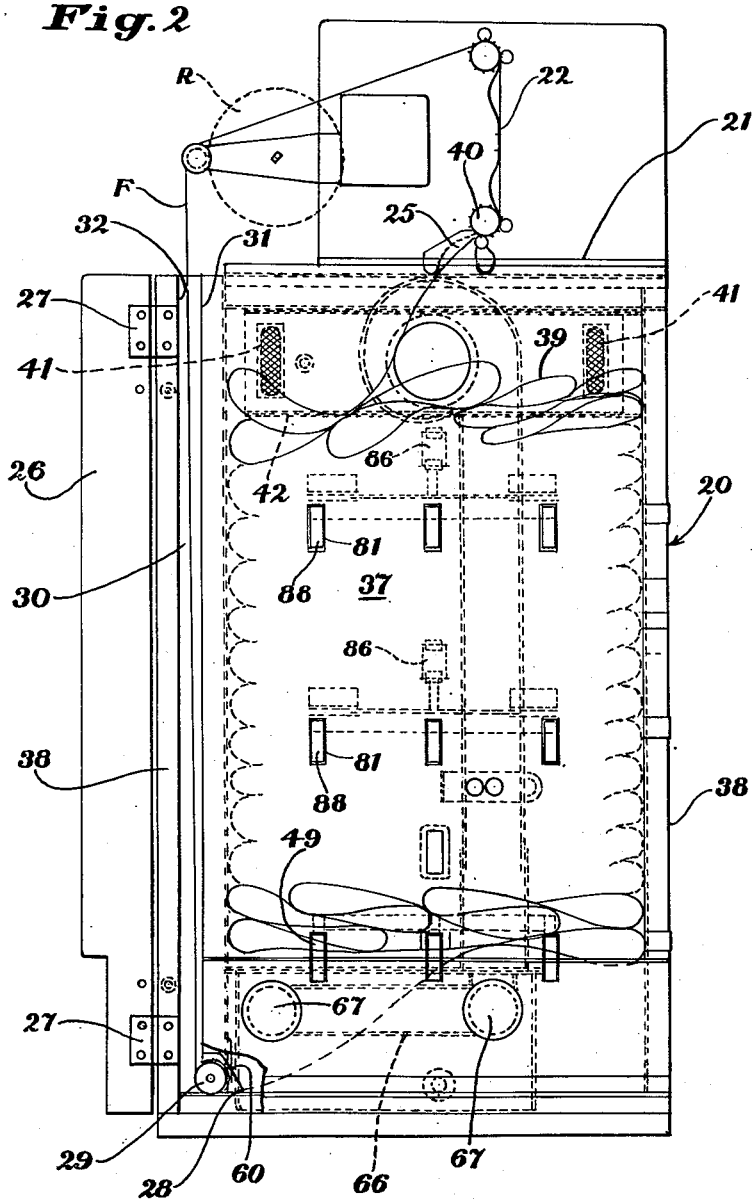

Oct. 1, 1957  R. W. WENGEL  2,808,259
CONTINUOUS FILM LOOP HOLDER FOR REPEATING PROJECTORS
Filed June 10, 1953  8 Sheets-Sheet 3
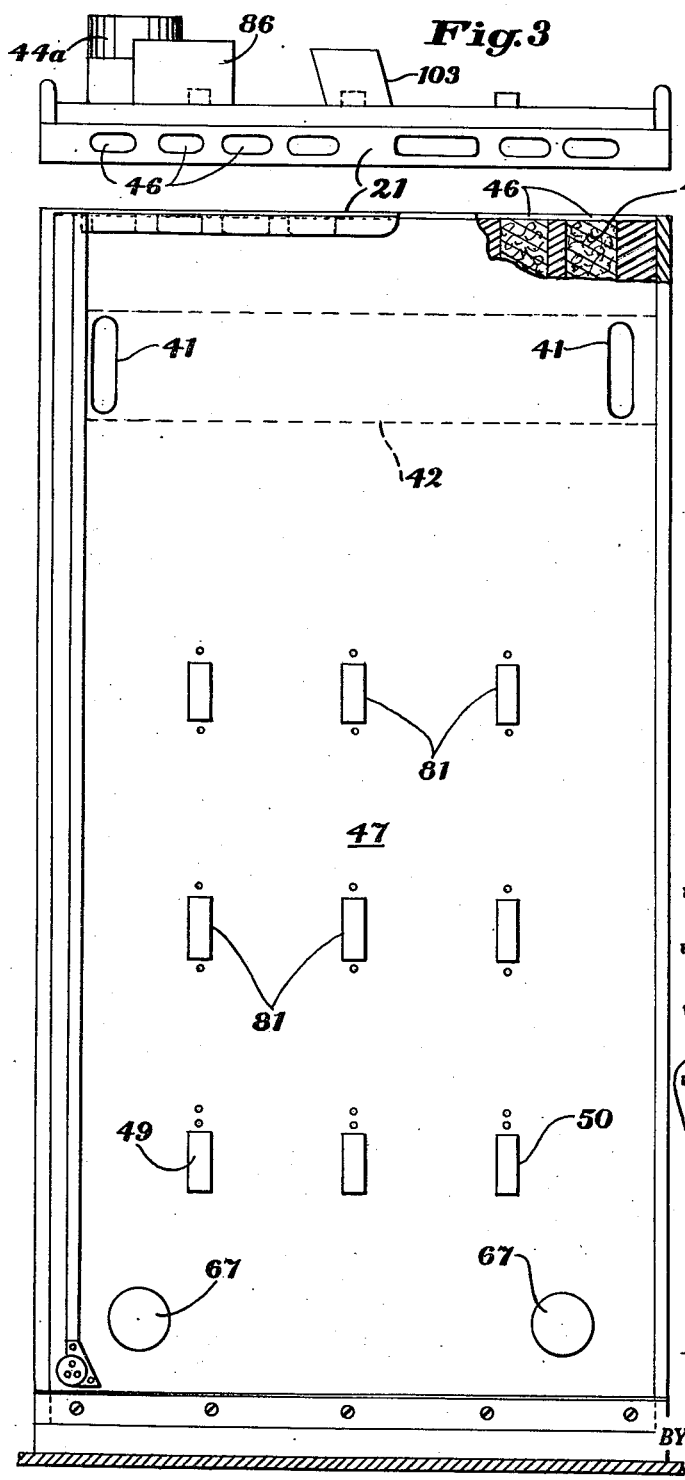
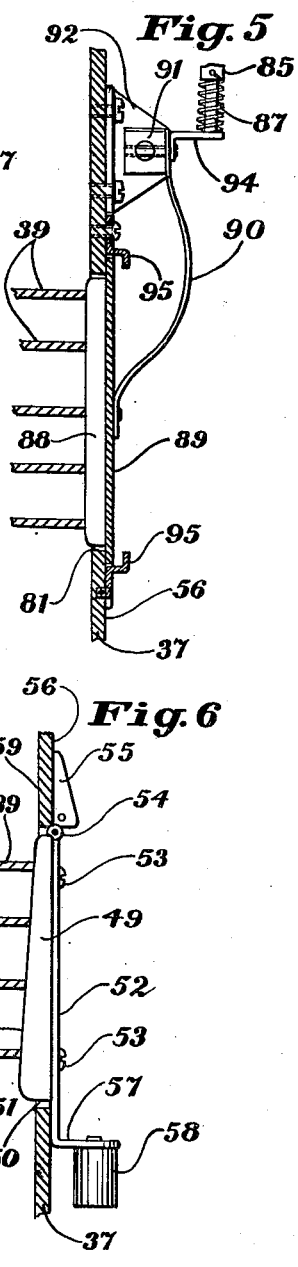
Raymond W. Wengel
INVENTOR.

Oct. 1, 1957   R. W. WENGEL   2,808,259
CONTINUOUS FILM LOOP HOLDER FOR REPEATING PROJECTORS
Filed June 10, 1953   8 Sheets-Sheet 4

Raymond W. Wengel
INVENTOR.

BY
ATTORNEYS

Oct. 1, 1957  R. W. WENGEL  2,808,259
CONTINUOUS FILM LOOP HOLDER FOR REPEATING PROJECTORS
Filed June 10, 1953  8 Sheets-Sheet 7
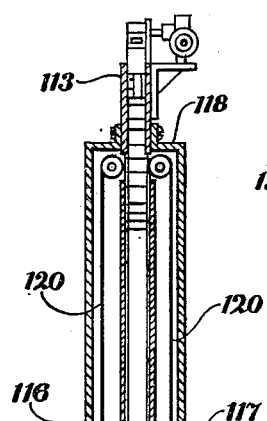
*Fig.11*
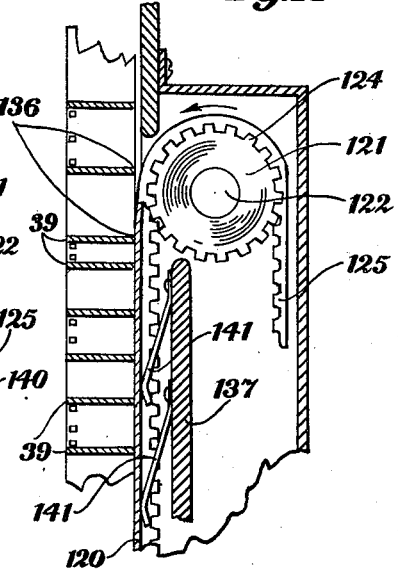
*Fig.14*
*Fig.13*
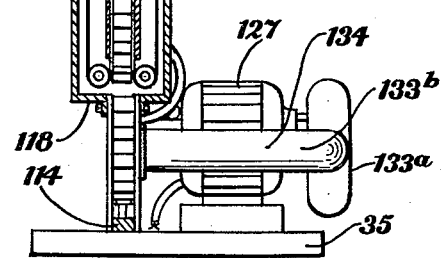
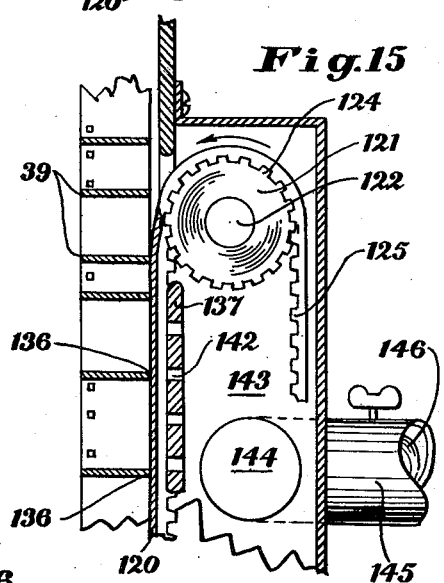
*Fig.15*
*Fig.12*
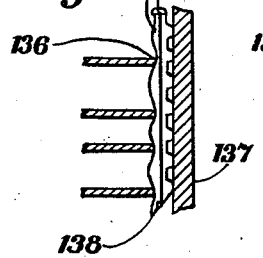
*Fig.16*
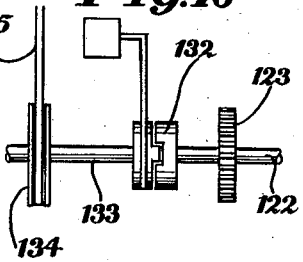
Raymond W. Wengel
INVENTOR.
BY
ATTORNEYS Oct. 1, 1957    R. W. WENGEL    2,808,259
CONTINUOUS FILM LOOP HOLDER FOR REPEATING PROJECTORS
Filed June 10, 1953    8 Sheets-Sheet 8

Raymond W. Wengel
INVENTOR.

BY
ATTORNEYS

United States Patent Office 2,808,259
Patented Oct. 1, 1957

2,808,259

CONTINUOUS FILM LOOP HOLDER FOR REPEATING PROJECTORS

Raymond W. Wengel, Rochester, N. Y., assignor to Eastman Kodak Company, Rochester, N. Y., a corporation of New Jersey Application June 10, 1953, Serial No. 360,727

13 Claims. (Cl. 271—2.15)

The present invention relates to a web storing device, and more particularly to a loop former and supporting arrangement for such a device for use in connection with a repeating projector.

With such projectors, the film to be exhibited is arranged in a long endless web, and is passed repeatedly through a projector, as is well known. In order to reduce storage space for the excess film, a suitable cabinet is provided in which the stored film is arranged in a series of overlying loops. As the film is fed from the projector into the cabinet, means, such as air streams, are provided to shift automatically the web laterally to arrange the web in a series of overlying loops. After the loops are formed, they are supported, in a manner to be later described, while they move downwardly towards the bottom of the cabinet from which point the web is withdrawn and returned to the projector. Humidity control may be provided to condition the web while the latter is positioned in the container or cabinet.

The present invention has as its principal object the provision of a web storage cabinet provided with improved loop forming and supporting means.

Still another object of the invention is the provision of auxiliary loop supporting means which is rendered operative automatically when the projector is not in operation.

Yet another object of the invention is the provision of a mechanism which serves both to support and move the formed loops through a storage cabinet.

And yet another object of the invention is the provision of a loop forming, supporting and moving means which are simple in design, easy to operate and highly effective in use.

To these and other ends the inventive idea resides in certain improvements and combinations of parts, all as will be hereinafter more fully described.

In the drawings:

Fig. 1 is an outside vertical side elevation view of the cabinet of the present invention, showing the relation thereto of a repeating projector of any suitable design;

Fig. 2 is a side elevation view of the cabinet of the present invention, with the side door open, showing one form of loop forming and supporting means constructed in accordance with one embodiment of the invention, the projector being shown diagrammatically;

Fig. 3 is a plan view of the cabinet illustrated in Figs. 1 and 2;

Fig. 4 is a side elevation view of the cabinet, similar to Fig. 2, with the parts in section, showing more clearly the auxiliary loop supporting members;

Fig. 5 is a vertical sectional view through one form of auxiliary loop supporting member, showing the relation of the parts;

Fig. 6 is a vertical sectional view of one of the members for supporting the bottom loops in the cabinet illustrated in Fig. 2;

Fig. 11 is a vertical sectional view through the cabinet mechanism illustrated in Fig. 10, showing the relation of the modified loop supporting and moving means;

Fig. 12 is a partial sectional view of one form of the loop supporting and moving means;

Fig. 13 is a view similar to Fig. 12, but showing another form of loop supporting and moving means;

Fig. 14 is a partial sectional view showing still another form of loop supporting and moving means;

Fig. 15 is a partial sectional view showing a further form of loop supporting and moving means;

Fig. 16 is a partial view showing a modified driving means for the loop supporting and moving means illustrated in Figs. 10–15;

Similar reference numerals throughout the various views indicate the same parts.

Figure 7:
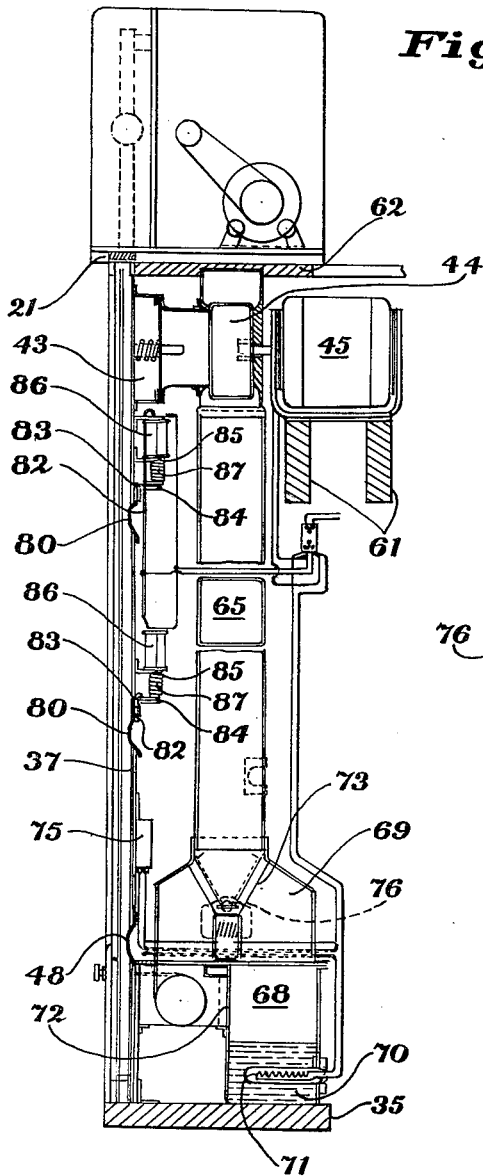
Fig. 7 is a side elevation view of the storage cabinet and various associated mechanisms for supplying air streams to form and support the loops, the auxiliary supports and the means for humidifying the air streams.

Fig. 1 shows a cabinet 20 in which the film web F is stored, and on the top 21 of which a projector 22 of any suitable design is mounted. The top 21 of the cabinet 20 has extending upwardly therefrom a standard 23 on which a film guide roller 24 is mounted. The film web F may be initially wound on the film reel or spindle R. The film is threaded through the projector in a well known manner, and is passed into the interior of the cabinet 20 through a short, open-sided channel 25, to the bottom of the cabinet 20, the door 26 being in open position. The door is connected to the container 20 by means of hinges 27. The film strip or web F is passed to the bottom of the container 20 and through an exit opening 28 and under a take-out roller 29, and is then passed up through an enclosure 30 formed in the cabinet between the adjacent vertical walls 31 and 32, as shown in Fig. 2. The top of the enclosure 30 is provided with an opening through which the web is fed to a roller 24 which directs the web back to the projector 22. The leader or forward end of the web is held for a time by the operator while the projector drive is operated to run all except two or three feet off the spindle reel R and into the cabinet 20. The remaining few feet of film are run off the reel R by hand, and the end is spliced to the leader so that the film is now in the form of a continuous loop threaded through the projector 22 and the cabinet 20. The door 26 may now be closed and the device is ready to operate.

The cabinet 20 is mounted on the support 35 and comprises a top wall 21 and back wall 37, opposite side walls 38 to one of which the door 26 is connected by the hinges 27, the door 26 serving as a front wall for the cabinet. If desired, the front wall may be formed in two parts one of which is fixed and the other comprises the door 26. Also, the door 26 may have a glass insert therein so the operation of the device may be viewed. The door 26 and back wall 37 are spaced a distance substantially equal to the width of the web, while the side walls 38 are spaced sufficiently to permit the web to be formed with a series of loops 39 as best shown in Fig. 2.

When the projector 22 is in operation, the film is fed by the feeding means of the projector, or the take-up sprocket 40, through the connecting channel 25 which is relieved on its working surface or the side adjacent the film emulsion to avoid scratching of the picture and sound areas. As the film enters the cabinet it immediately meets streams of air which are moving laterally to move the web to form the web into overlying film loops in the top of the cabinet, as shown in Fig. 2.

In order that the film web F may be formed immediately into loops upon entering the cabinet 20, the back wall 37 of the latter adjacent the top thereof is provided with two laterally spaced air outlets or exhaust ports 41, positioned adjacent the side walls 38, as best shown in Fig. 4. These outlets 41 are connected by a conduit 42 which extends across the outer or back surface of the back wall 37 to the inlet side 43 of a blower 44 positioned behind the back wall 37 and connected to and driven by an electric motor 45, as shown in Fig. 7. The motor 45 may be supported on blocks 61 which, in turn, are carried by an enclosed housing, part of which is shown at 62, Fig. 7, which encloses all the mechanisms behind the cabinet 20. The inlet 43 has a suitable valve for controlling the air supplied to the inlet, and hence the amount of air drawn through the ports 41. The valve may be of any suiatble design; and, in the present case, comprises a pair of overlying plates, not shown, provided with apertures which may be moved to and from registration by relative rotation of the plates to vary the opening to the blower. Air is drawn into the cabinet 20 through a series of openings 46 formed in the top wall 21 and containing a suitable filter material 47, as shown in Fig. 4. As the air enters through openings 46 it moves laterally towards the exhaust ports 41 and in so moving directs the film web F towards said ports to form the web into loops 39 in the upper part of the cabinet, as is deemed apparent from an inspection of Fig. 2. These air streams also reduce the natural tendency of the loops to jam against the top 21. Thus, as soon as the web enters the cabinet 20, it immediately encounters the air streams moving from the openings 46 to the exhaust ports 41, and the web is arranged in the from of overlying loops, the direction of movement of the web depending, of course, on the dominant flow of air at the moment.

It will be apparent from an inspection of Fig. 2, that the loops 39 after being formed, will move towards the bottom of the cabinet, and may tend to crush or crowd the lower loops. Such crushing or crowding may interfere with the withdrawal of the web by means of the withdrawal roller 29. In order to eliminate such a possibility, the present invention provides a set of spring fingers or pads, broadly indicated by the numeral 48, Fig. 7, and located near the bottom of the cabinet above the support 35 for the purpose of interfering lightly with the film loops as they slide downward within the cabinet 20, and acting as a false bottom to relieve the withdrawing film of the pressure of the loops above it. In addition, air currents are supplied to the cabinet adjacent the bottom thereof and the upward flow of these air currents provides a lifting effect on the loops and aids in the support of the latter.

These lower fingers or pads 48 are best shown in Figs. 4 and 6, and comprise rectangular members 49 which are preferably formed of a high polished material, such as "Bakelite," and which project through registering openings 50 in the back wall 37. The front face 51 of each member 49 is inclined downward, as shown in Fig. 6, so as not to interfere with the free downward movement of the loops, as is deemed apparent from and inspection of Fig. 6. Each member 49 is, in turn, secured to a plate member 52 by screws 53, or other suitable fastening means, and the member 52 is pivotally connected at 54 to a bracket 55 mounted on the rear surface 56 of the back wall 37. The lower end of plate 52 is bent outward as shown at 57 and has secured thereto a weight 58, as shown in Fig. 6. It will be apparent from an inspection of Fig. 6 that each weight 58 will cause associated plate 52 and hence member 49 to swing in a clockwise direction about pivot 54 so that the inclined surface 51 will always be in position inwardly beyond the inner surface 59 of the rear wall 37 so the members 49 will always be in position to engage and support the lower film loops 39 to retain the loops above the bottom of the cabinet 20. The members 49 thus provide a false bottom which effectively maintains the film loops above the exit slot 28 so as not to interfere with the free and uninterrupted withdrawals of the film web from the cabinet 20 by means of roller 29. As the roller 29 draws the web F out of the cabinet, there is a possibility that a film loop might be withdrawn under the roller 29 creasing the outgoing web, the disadvantages of which are deemed apparent. In order to eliminate such a possibility, the present invention provides a shoe or guard 60 of the shape best shown in Fig. 2, and positioned inwardly or just ahead of the exit opening 28. This shoe 60 creates a lifting tendency to the web as it approaches the roller 29 and thus prevents creasing or bending of the film web.

As mentioned above, air currents are supplied to the cabinet adjacent the bottom thereof, and these air currents cooperate with the pads 49 to support the film loops. These supporting air currents may be supplied in any suitable manner. For example, the exhaust or pressure side of the fan or blower 44 may be connected by a suitable duct 65 which extends downward behind and substantially parallel to the back wall 37 of the cabinet 20, as best shown in Fig. 7. The lower end of duct 65 is connected to a horizontal duct 66, which extends across and behind back wall 37, and is provided with suitable connections which extend through register openings 67 in the back wall 37 connecting the lower inner portion of the cabinet 20 is fluid communication with the ducts 65 and 66 to supply air under pressure to the lower portion of the cabinet, and below the film loops to support the latter, as mentioned above. While two such openings 67 are shown, this is by way of illustration only as any suitable number of such openings may be provided. The air under pressure issuing from the openings 67 moves upward through the cabinet and provides a fluid means which cooperates with the pads 49 to support the film loops to prevent crowding of the latter at the bottom of the cabinet. The amount of air supplied through openings 67 may be controlled by means of a suitable damper arrangement, not shown, positioned in duct 65. Such a damper may be in the form of a sliding plate which is movable radially across the duct 65 to control the effective opening thereof. As other suitable means may be provided to control the air in duct 65, details are not deemed necessary.

Thus, the loops 39 are supported cooperatively by the pads 49 and by the air stream supplied through openings 67. These upward moving air streams are distributed substantially throughout the cross-section of the cabinet 20 by flowing through the film perforations and past the edges of the loops 39, so the film web everywhere in the cabinet 20 below the exhaust ports 41 is supported against gravity. If the air flow is adjusted suitably, the greater part of the weight of the film is carried by the air streams and cannot add a crushing force on the lower loops.

Figure 8:
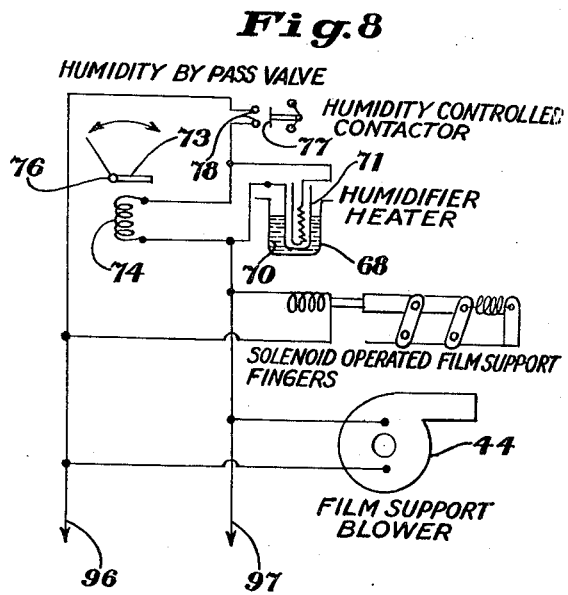
Fig. 8 is a wiring diagram for the mechanism illustrated in Fig. 7.

In order to maintain the proper humidity of the atmosphere within the cabinet 20, the air supplied through openings 67 may be passed through a humidifying chamber 68 which is connected to the lower end of the duct 65 by a Y-connection 69, the other leg of which is connected to duct 66, as shown in Fig. 7. Humidifying chamber 68 extends below duct 66, see Fig. 7, and is adapted to contain a body of liquid, 70 such as water. A heating element 71 is positioned in the liquid, and is connected into the electric circuit, as shown in Fig. 8, to heat the water. The humidifying chamber is connected to duct 66 through an opening 72 for a purpose to be presently described. A flap damper 73 is pivoted at the apex of the Y-connection, and is under the control of a solenoid or relay 74, which is actuated from a humidistat 75 which is in communication with the interior of cabinet 20. When the humidity within the cabinet 20 is at the proper level, the solenoid 74 will cause the flap damper 73 to move about its pivot 76 to the right position in Fig. 7, so the air will flow downward through duct 65 and directly into duct 66, by-passing humidifying chamber 68. However, when the humidity in the cabinet 20 drops below a predetermined point, the humidistat 75 will cause plate 77 thereof to move to the left, as viewed in Fig. 8, to close contacts 78 to energize the solenoid 74 and the heater 71. When the solenoid 74 is energized, damper 73 will be pivoted counterclockwise and will move about its pivot 76 to its left position in Fig. 7, to place duct 65 in fluid communication with the humidifying chamber 68. Air will then be drawn through duct 65, humidifying chamber 68 and over the body of heated water 70 to pick up the necessary amount of moisture. The humidified air will then flow through opening 72 from humidifying chamber 68 and into duct 66 to supply properly humidified air to the cabinet 20. By means of this arrangement, proper humidity is maintained within the cabinet 20. It will be noted from an inspection of Fig. 8 that the solenoid 74 and the heating element 71 are arranged in parallel relation.

It will be apparent from the above description that so long as blower 44 is in operation, the loop forming air will be drawn through openings 46 and will be discharged through ports 41 to cause the incoming film web to be formed into laterally arranged loops in the top portion of the cabinet 20. In addition, the blower 44 supplies air under pressure and proper humidity through opening 67 in the bottom portion of the cabinet. These latter air streams then flow upward through cabinet 20 and cooperate with the pads 49 to support the film loops, the air supplied through opening 67 being finally exhausted through ports 41. However, when the blower is shut down, the air support for the loops is cut off, as is deemed apparent. Nevertheless, even when the blower is shut down, the weight-loaded fingers 49 will still serve to support the loops 39 above the bottom of the cabinet, as shown in Figs. 2 and 6. Due to the lack of support, however, the loops above the fingers 49 may press downward and may tend to buckle or crease the film. Therefore, the present invention provides auxiliary supporting means above the fingers 49 which cooperates with the latter to support the loops when the blower is shut down.

These auxiliary supports may take various forms. For example, as shown in Fig. 7, these auxiliary supports may be curved, spring-actuated fingers 80 which are adapted to extend through registering openings 81 in the back wall 37 to engage one edge of the loops to support and hold the loops in supporting relation between the fingers 80 and the inner surface of the door 26, or the adjacent portion of the front wall. Two groups of these auxiliary fingers are shown, but obviously any other number may be used. When the blower 45 is in operation, it is desirable that the fingers 80 be withdrawn to an inoperative position and out of contact with the loops. To secure this result, each group of three fingers is mounted on one leg 82 of an angle iron, which is pivoted at its apex 83 to the rear surface 56 of the back wall 37. The other leg 84 of the angle iron is connected to the armature 85 of a solenoid 86 mounted on the rear surface 56 of the back wall 37. A coil spring 87 is wrapped around the armature 85 and is positioned between the latter and the other or horizontal leg of the angle iron shown in Fig. 7. Now, when the blower is in operation, solenoid 86 will be energized and will move the armature 85 upward to impart a counterclockwise rotation to the angle iron to withdraw the fingers 80 out of the openings 81 and out of engagement with the film loops. Thus, as long as the blower is in operation, the film loops will be supported by air pressure and not by the auxiliary fingers 80. However, when the blower is shut down, the solenoid 86 will become deenergized, and the coil springs 87 will then become operative to impart a clockwise rotation to the angle iron to move the fingers 80 through the openings 81 and into engagement with the film loops to support the latter effectively when the air supporting streams are removed, as shown in Fig. 2. The fingers 80 move automatically into loop supporting relation when the blower is shut down, thus eliminating any necessity for attention on the part of the operator.

Fig. 5 shows another form of auxiliary supporting fingers. Here again the fingers may be arranged in two groups of three each. In this embodiment each auxiliary finger is in the form of a soft pad 88, such as sponge rubber, which is suitably secured to a plate 89 which, in turn, is connected by a bent spring member 90 to a square shaft 91, the ends of which are rounded and supported in bearing brackets 92 suitably mounted on the rear face 56 of the back wall 37, as clearly illustrated in Fig. 5. When in operative position, as shown in Fig. 5, the pads 88 extend through registering openings 81 in the back wall 37 to engage the loops to cooperate with the front wall member of the cabinet to support the loops. The shaft 91 has projecting laterally therefrom, an arm 94 which is connected to the lower end of the solenoid armature 85. Thus, when the blower is in operation the solenoid is energized and will rock shaft 91 counterclockwise to shift the pads 88 out of loop supporting relation, the movement of the pads being limited by stop member 95 positioned adjacent the openings 81, as best shown in Fig. 5. However, when the blower is shut down and the solenoid 85 is deenergized, the coil springs 87 immediately come into operation to impart a clockwise rotation to shaft 91 to move the pads 88 through opening 81 and into supporting relation with the film loops 39, as shown in Fig. 5. These auxiliary supporting fingers move automatically into loop supporting position when the projector is not in use and prevent the film loops from falling to the bottom of the cabinet in sufficient amount to flatten or crease the lowermost loops.

It will be apparent from an inspection of Fig. 8 that when lines 96 and 97 are connected to a source of electric current, the blower 44 will be operated to supply loop forming air streams to the cabinet 20. Also, the solenoids 86 will be energized to withdraw the auxiliary pads 80 or 88. If the humidity in the cabinet is within the required amount, the flap damper 73 would rock to by-pass the humidifier. However, if the humidity is below the required amount, the humidistat will function to move the plate 77 into engagement with the contacts 78 to energize solenoid 74 to shift the damper 73 to a position such that the air being supplied to the bottom of the cabinet will pass through a humidifying chamber 68 so that air of the proper humidity will be delivered to the cabinet.

Figure 9:
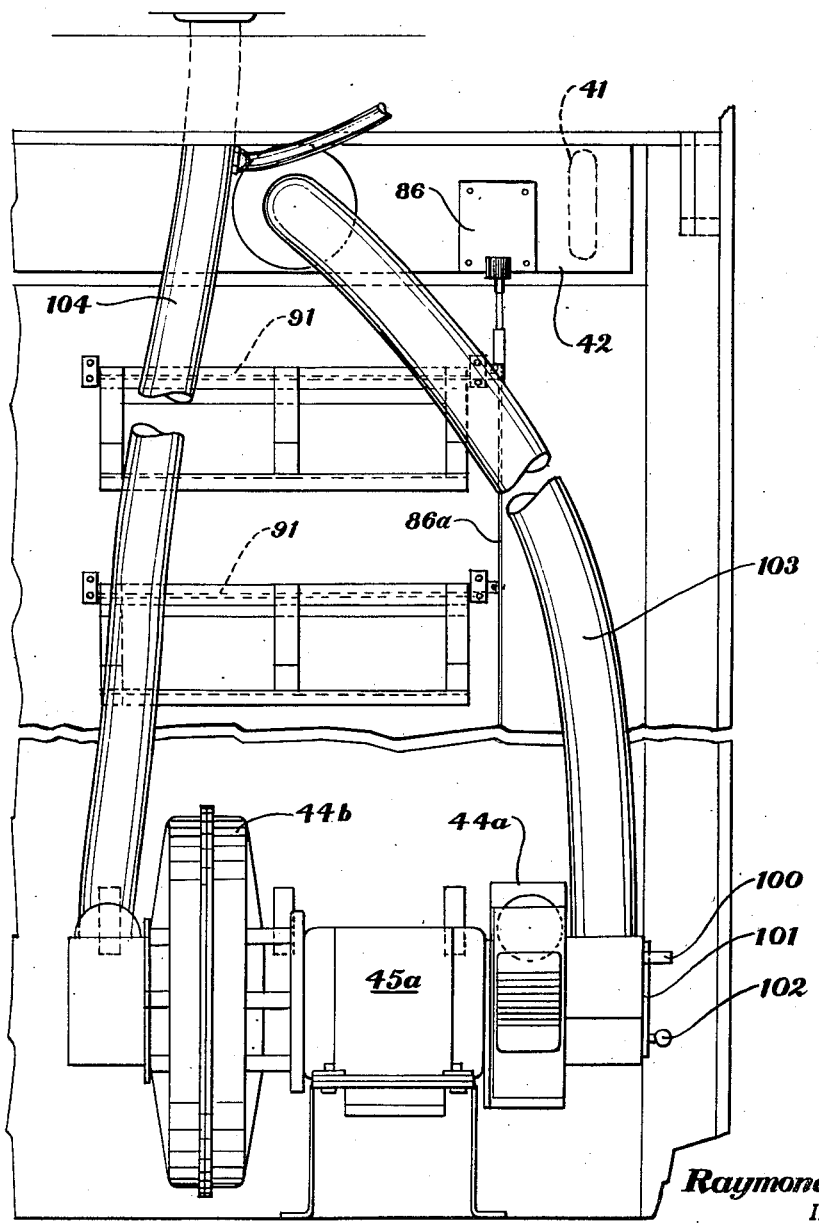
Fig. 9 is a modified arrangement for the blower arrangement for supplying the loop forming and supporting air streams.

Fig. 9 shows a slightly modified arrangement in which the blower 44a and the motor 45a are positioned at the bottom of the apparatus. In this modification, the inlet of the blower is connected to the conduit 42 by a pipe 103 so the blower 44a will serve to draw air through openings 41 to form the loops, as above described. The outlet or pressure side of the blower 44a may be connected, in any suitable manner, to the pressure outlets 67 to supply the loop supporting air. A humidifier, not shown, may also be provided to properly humidify the air supply through an opening 67. In this modification a solenoid is not used to move the flap damper 73. On the contrary, this damper, not shown in this view, is pivoted at 100 and the pivot has connected thereto a plate 101 which carries a hub or handle 102 by which the plate 101 and pivot 100 may be rocked to shift the damper 73. The motor 44a may also have connected thereto a second blower 44b, the inlet or suction side of which is connected by a pipe 104 to the projector, not shown, to operate a suction type of pulldown. As such a pulldown forms no part of the present invention, details thereof are not shown or described as they are not deemed necessary to a full and complete understanding of the present invention. Also, in Fig. 9, a single solenoid 86 is connected by means of a rod 86a to the two shafts 91 so that both groups of pads 88 can be moved as a unit.

In the above structures, any perforations or openings in the plates or on the inner surfaces of the cabinet 20 should be steeply beveled so that the film edges and loops cannot catch on them. Holes larger than the loop ends are fitted with grills or screens which are arranged perfectly flush with the surface of the cabinet, or slightly recessed to avoid interference with the free sliding of the film loops.

Experience with the above-described loop former and holder arrangement showed that under low humidity conditions and with certain desirable finishes on the front and back plates (similar to 26 and 37), the electrostatic charge developed on the film web was sufficient to make the loops adhere to the plates and strongly resist sliding downward in the cabinet. At times, this effect was so great as to cause the loops to pack at the top of the cabinet and force the entering film to buckle as it left the feed-in sprocket. By providing a closely fitting channel 110 for the entering film extending all the way from the feed-in sprocket 111 to within cabinet 20, see Fig. 10, the buckle was prevented; but the packing of the loops at the top of the cabinet continues to be an undesirable feature since it tended to form loops of too small a radius with the result that kinking of the film could occur.

In order to overcome this disadvantage, the present invention provides an arrangement for supporting and positively moving the loops downward in the cabinet. These loop moving means are shown in Figs. 10–15 and positively carry the loops downward from near the top of the cabinet to a position near the bottom thereof with automatic control of the rate of transport to suit the rate a which the film is fed into the holder. This result is accomplished by lightly clamping the film loops edgewise between the surfaces of an opposed pair of wide flat belts which are driven downward and carry the loops of film so engaged as illustrated in Figs. 10–15, to be later more fully described. For the purpose of clarity, the loop forming means in these figures has been omitted, but the loops may be formed in the manner above described, namely by air entering the top openings 46 and moving laterally to the exit ports 41 to engage the incoming film to move the latter to form the loops. The balance of the description accordingly will be confined to the loop supporting and moving means.

Figure 10:
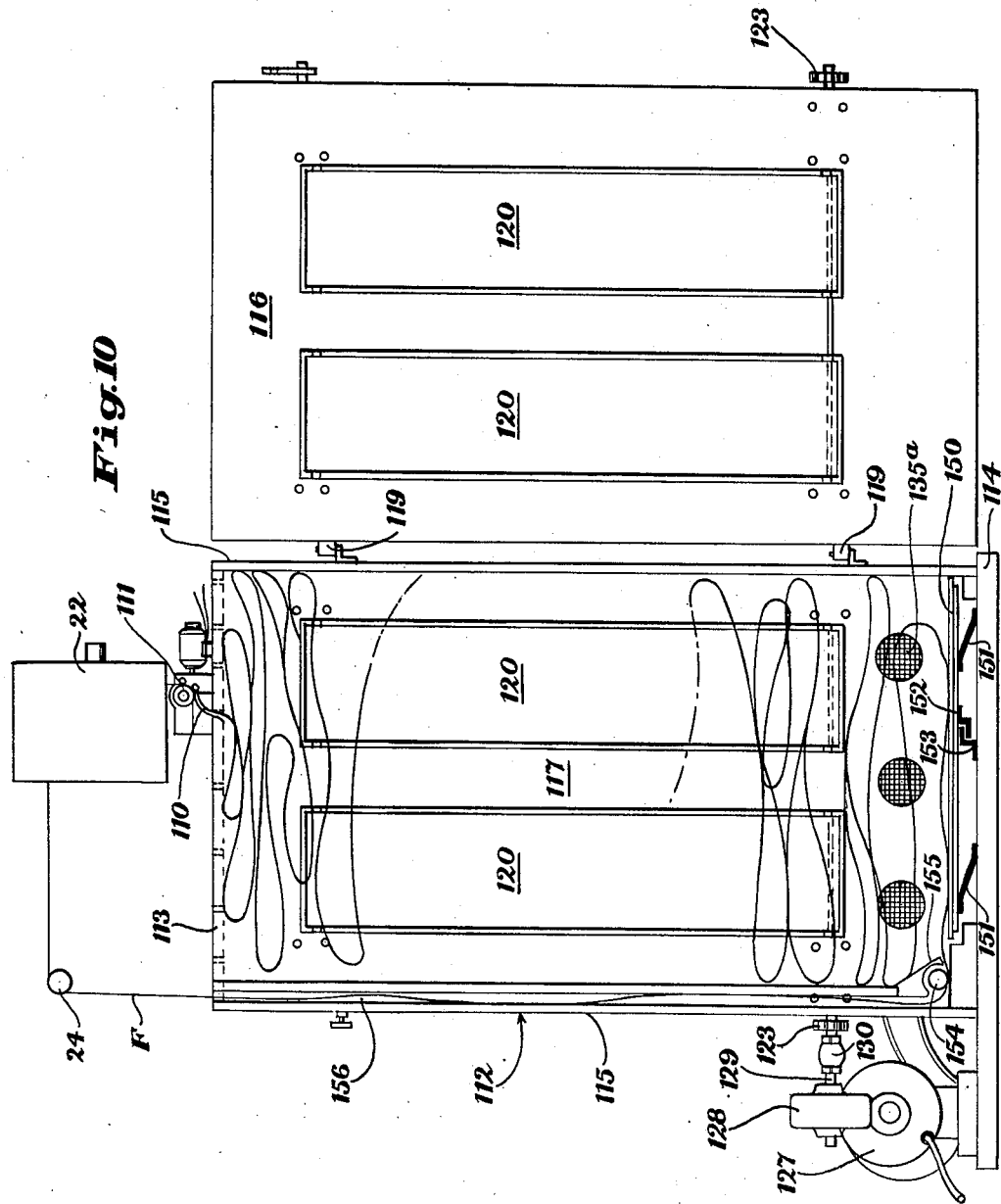
Fig. 10 is a view similar to Fig. 2, showing a modified arrangement for supporting the formed loops and for moving the formed loops from the loop forming means towards the discharge opening, the door of the cabinet being in open position.

Fig. 10 shows a cabinet generally indicated by the numeral 112 adapted for use with the modified film moving and supporting means, Figs. 10–15, and comprising a top 113, bottom 114, ends 115, a front wall 116 and back wall 117. It will be noted from an inspection of Fig. 11 that the main portion of the front and back walls are spaced a distance materially greater than the width of the film web, the purpose of which arrangement will be later more fully described. The offset portions of the front and back walls are connected to the upper and lower portions by short members 118. Thus, the main or intermediate section of the film receiving cabinet is of greater thickness than the upper and lower portions shown in Fig. 11. The front wall 116 may be in the form of a door which is connected to the adjacent end wall 115 by means of suitable hinges 119. The front wall 116 and back wall 117 each has mounted thereon a pair of spaced endless belts, generally indicated by the numeral 120, and later more fully described. Each endless belt 120 is supported on a roller 121 mounted on a shaft 122, arranged at the top and bottom of each belt, as shown in Fig. 11.

While the shafts 122 for each pair of rollers 121 of a pair of belts may be independent, it is preferred to mount a pair of aligned rollers, in the present instance the bottom rollers, of adjacent belts on a single shaft so that both belts may be driven as a unit from a common source. To this end, the bottom rollers 121 of each pair of belts are mounted on a single shaft 122 which has an end which projects through an end wall 115 of the cabinet 112 and carries gear 123. When the door of the front wall 116 is closed, the gear 123, shown at the right of Fig. 10 will mesh with the gear 123, shown at the left of Fig. 10, so that by applying power to either shaft 122, both pairs of belts will be driven as a unit. As noted in Fig. 10, the belts 120 extend close to the top wall 113. This is for the purpose of limiting the capacity of the space above the belts to relatively few loops which are formed in the manner above described, so that pressure can be kept well below that which might cause buckling of the film and still be enough to overcome the force caused by the static charge.

The belts 120 are mounted in pairs, as shown in Fig. 10, and are so spaced that when the door or front 116 is closed, the inner runs of the belt are substantially flush with the upper and lower portions of the front and back walls, see Fig. 11. With this arrangement the inner runs of the belts are spaced substantially the width of the film web so as to firmly and positively engage the opposite edges of the web to move the loops downward positively. While suitable motion can be transmitted to the belts 120 by friction from the shafts 122, it is preferred to secure a positive drive by providing the periphery of each roller 121 with teeth 124 which mesh with corresponding teeth or cogs 125 formed on the inner surface of each belt, as clearly illustrated in Fig. 13. Each roller 121 with its teeth 124 may extend the full width of the belt 120, in which the cogs 125 will also extend the full width of belt 120. On the other hand, the cogs 125 may be made narrow and be positioned only adjacent the marginal edges of the belts 120, in which case the roller 121, or at least the tooth portion 124, will be narrow and will be arranged on the ends of shaft 122. This structure insures against a difference in speed of the belts sufficient to cause twisting of the loops.

Belts 120 may be driven in unison at the same speed by applying power to one of the gears 123, as is deemed apparent. To secure this result, an electric motor 127 is connected through a gear reduction unit 128 to a shaft 129 which, in turn, is connected through a suitable coupling 130 to one of the gears 123 to drive one of the lower shafts 122 and hence one of the pairs of belts 120. Power is transmitted to the other shaft 122 by means of the second gear 123 which meshes with the driven gear 123 so that both pairs of belts are driven positively at the same speed. It is apparent that when the door or front 116 is closed, the two gears 123 will be meshed so that both belts will be driven, yet the gear arrangement in no way interferes with the easy and ready opening of the front or door 116. In some cases it may be desirable to drive the pair of belts 120 directly from the projector so that the motion of the belts will be synchronized with the projector operation. To secure this result, see Fig. 16, one of the gears 123 may be connected through a suitable clutch 132 with shaft 133 on which is mounted a pulley 134 which may be connected by means of a belt 135 to a suitable drive member, not shown, on the projector.

As the belts 120 serve to support and move the formed loops, it is not necessary to apply loop supporting air to the bottom of the cabinet, as in the embodiment illustrated in Figs. 1–7. However, it may be desirable to supply proper humidified air to the interior of the cabinet 112. To this end a blower 133a may be connected to the motor 127 to be driven therefrom. The outlet or pressure side of the blower is connected by means of a conduit 133b to a suitable source of humidity, not shown, to the inlet openings 135a formed in the back wall 117 adjacent the bottom thereof, as illustrated in Fig. 10. The humidifying means may be of any suitable type such as that shown in Fig. 7, and above described. Thus, air of the proper humidity is supplied to the cabinet to maintain the film in proper physical condition, the advantages of which are deemed apparent. Figs. 12–15 show various types of belt constructions for securing light engagement of the belts with the edges 136 of the film loops 39. In Figs. 12 and 13 the downward moving side of each belt 120 is guided by a backing plate 137 which limits or positions the rear surface of each belt 120 to a definite position relative to the edges 136 of the loops 39, so that the front surface of the belts will not forcibly bear on the loops 39 yet will engage the loops sufficiently to move the loops downward in the cabinet 112. The front surface 138 of the belt, Fig. 12, is provided with a soft or yieldable material 139, such as soft rubber, while the front surface of the belt, Fig. 13, is provided with a plurality of flexible bristles 140. The material 139 or the bristles 140 lightly interferes and imparts motion to the edges 136 of the loops 39 thus securing a positively maintained downward movement of these loops corresponding to the downward movement of the belts, as is deemed apparent.

Fig. 14 shows a slightly modified backing plate arrangement in which the backing plate 137 has secured thereto, several rows of comblike cantilever fingers 141 which yieldably engage the rear surface of the belt 120 to retain the front surface thereof in positive yet yieldable engagement with the edges 136 of the film loops. If desired, the free ends of the fingers 141 may be provided with small rollers, not shown, so as to reduce the wear on the belt 120.

Fig. 15 shows still another modification of the belt backing in which the backing plate 137 is provided with a plurality of apertures 142 through which air under pressure may be directed against the backing surface 126 of the belt 120 to maintain the front surface 130 thereof in engagement with the loop edges 136. To secure this result, the area 143 back of the plate 137 forms a plenum chamber having an opening 144 which is connected by a duct 145 to a suitable source of air under pressure, not shown. A suitable adjustable damper 146 may be positioned in duct 145 to control the amount of air supplied to chamber 143, and hence belt 120.

It should be mentioned that in the belt backing arrangement of Figs. 12–15, only one pair of belts on one side of the loops need be provided with means for holding the belts in engagement with the edges 136 of the loops 139. The pairs of belts on the other side of the loops may be plain and merely serve as synchronously moving backing surfaces to sustain the interference or edge pressure of the two pairs of blades on opposite edges of the film loops.

To control the downward movement of the film loops and the belts, the bottom of film cabinet 112 is fitted with a member 150, Fig. 10, mounted on springs 151 and carrying a contact 152 which is normally closed with contact 153 carried by the bottom 114. The contacts 152 and 153 are connected into the circuit of the motor 127, or solenoid operated clutch, such as clutch 132, so that the motor or clutch may be operated when necessary. Member 150 is in the form of a narrow strip and acts as a false bottom in cabinet 112 to sustain the loops above bottom 114, as is deemed apparent from an inspection of Fig. 10. As the loops 139 accumulate, the pressure they exert on the false bottom 150 increases, causing the bottom 150 to move downward against springs 151 until finally the contacts 152 and 153 are open and the drive to the belts 120 is stopped. When a sufficient amount of film has been withdrawn by lower roller 154 in the bottom of the cabinet, the pressure is relieved on the plate 150 and later moves upward under action of the springs 151 to close contacts 152 and 153 to energize the motor to start the belt drive means. A suitably shaped shoe 155 is provided to direct the outgoing film to the roller 154. After leaving the roller 154, the film passes through a narrow chamber or closure 156, formed in cabinet 12, to roller 24 from which the film passes to the projector 22.

Figure 17:
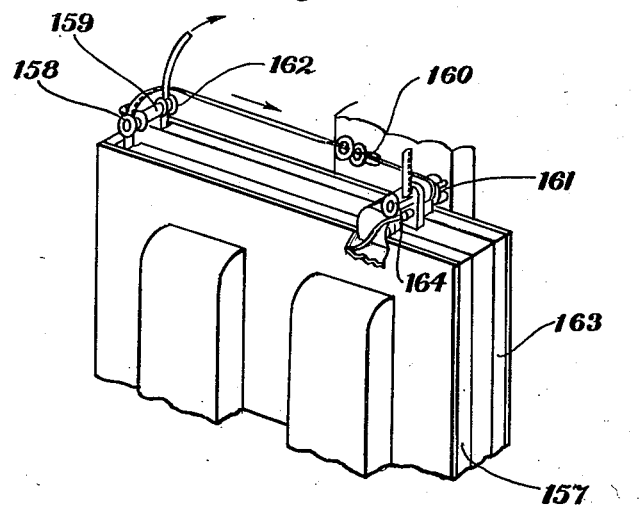
Fig. 17 is a perspective view showing a double or tandem form of web storage cabinet and means for passing the loop from one cabinet to another.
Figure 18:
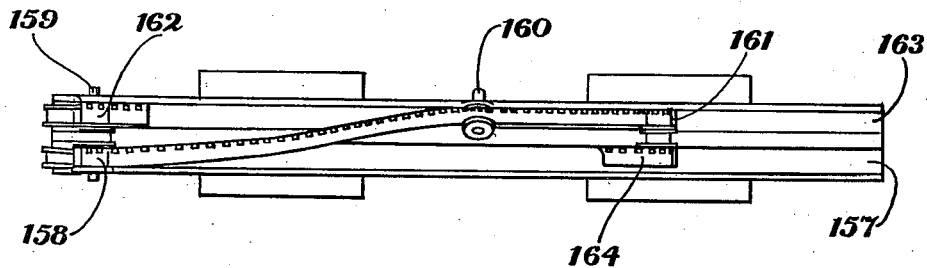
Fig. 18 is a plan view of the tandem cabinet arrangement illustrated in Fig. 17.

Except with the construction illustrated in Fig. 15, the film loops 39 are at all times caught and held between the opposite pairs of belts 120, as shown in Fig. 11, so the loops are held against falling into the space at the bottom of the cabinet. However, when air is used to create the belt pressure against the loops, as shown in Fig. 15, some auxiliary means, such as the above-described solenoid operated pads 49, must be provided to support the loops when the air is shut off, as when the projector is shut down. While a single cabinet 20 or 112 may provide the necessary film length or storage, if a still larger amount of film is required two or more such cabinets may be arranged in tandem or series relation, as shown in Figs. 17–18, to increase the film capacity. Film from the projector may be directly fed into one of the cabinets 157, say the left one, Figs. 17–18. The film passes through a cabinet in the above-described manner, is then discharged therefrom over a sprocket 158 carried on the shaft 159 supported on the top left end of the tandem arrangement. From the sprocket 158 the film passes over a slanted crossover sprocket 160 to a second feed-in sprocket 161 positioned over the right hand cabinet 157 in alignment with the feed in sprocket for the left cabinet. Sprocket 161 then feeds the film into the right hand cabinet 157; and, after the film has passed therethrough, it engages a sprocket 162 carried by shaft 159 to feed the film back to the projector. In this manner the supply of film may be increased.

While only two such series of arranged cabinets are shown, this is by way of illustration only, and any additional number of such cabinets may be connected to enlarge the film supply to any desired amount.

The present invention thus provides a film supply cabinet in which the film is formed automatically into loops as it enters the cabinet, and in which the film loops are positively supported. In certain embodiments, means positively engages the edges of the film loops and moves the film downward. These moving means are controlled in response to the amount of film which is accumulated in the cabinet. If desired, a plurality of cabinets can be arranged in series relation to increase the supply of film. With the positive transport of the film loops, it is possible to operate the mechanism in a horizontal position, thus giving the present device a design advantage. It is apparent from the above description that not only are the loops formed automatically, but the supporting means also provides an automatic arrangement for supporting the loops both when the projector is in operation as well as when the projector is shut down. This supporting means prevents crowding, bending or buckling of the lower loops. With this automatic loop feed, moving and supporting means, no attention is required on the part of the operator. The structure of the present invention is relatively simple in design, positive in its operation, and highly effective in use.

While certain of the embodiments of the invention have been disclosed, it is to be understood the inventive idea may be carried out in a number of ways. Therefore, the present application is not to be limited to the precise details described, but is intended to cover all variations and modifications which fall within the scope of the appended claims.

What I claim and desire to secure by Letters Patent of the United States is:

1. A web storing device comprising, in combination, a cabinet into which the web is fed and from which the web is withdrawn, said cabinet being formed with an inlet adjacent the top thereof and an outlet adjacent the bottom thereof, means in said cabinet adjacent said inlet acting on said web passing through said inlet to form said web into loops adjacent said inlet, fluid means for supporting the formed loops in the main portion of the cabinet above said bottom, and auxiliary mechanical loop supporting means positioned in said cabinet adjacent said outlet.

2. A web storing device comprising, in combination, a cabinet into which the web is fed and from which the web is withdrawn, said cabinet being formed with a web inlet and a separate web outlet, pneumatic means for forming said web into loops within said cabinet, and cooperating fluid and mechanical means for supporting said formed loops in said cabinet.

3. A web storing device comprising, in combination, a cabinet into which the web is fed and from which the web is withdrawn, said cabinet being formed with a web inlet and a separate web outlet, fluid pressure means in said cabinet for forming said web into loops adjacent the top of said cabinet, fluid means for supporting the formed loops in the main portion of said cabinet above said bottom, and auxiliary mechanical means adjacent said bottom and cooperating with said first supporting means to support the formed loop in said cabinet.

4. A web storing device comprising in combination a cabinet into which the web is fed and from which the web is withdrawn, said cabinet being formed with a web inlet and a web outlet, pneumatic means adjacent said inlet to form said web into loops upon being fed through said inlet, and pneumatic and mechanical means for supporting said formed loops in said cabinet.

5. A web storing device comprising, in combination, a cabinet into which the web is fed and from which the web is withdrawn, said cabinet being formed with a web inlet and a web outlet, pneumatic pressure means adjacent said inlet to form said web into loops upon being fed through said inlet, pneumatic pressure means for supporting the formed loops in the main portion of said cabinet above the bottom thereof, and auxiliary means adjacent said bottom cooperating with said first supporting means to support the formed loops in said cabinet.

6. A web storing device comprising, in combination, a cabinet into which the web is fed and withdrawn, said cabinet being formed with a web inlet adjacent the top thereof and a web outlet adjacent the bottom thereof, fluid means adjacent the inlet and acting directly on said web and constitutes the sole means for forming the fed-in web into loops adjacent the top of said cabinet, fluid means for supporting said loops in floating relation in said cabinet while the web is being withdrawn through said outlet, and mechanical means cooperating with said last fluid means for supporting said formed loops.

7. A web storing device comprising, in combination, a cabinet into which the web is fed and withdrawn, said cabinet being formed with a web inlet adjacent the top thereof and a web outlet adjacent the bottom thereof, air pressure means adjacent the inlet for forming the fed-in web into loops adjacent the top of said cabinet, air pressure means for supporting said loops in the main portion of said cabinet above said bottom, and mechanical means engaging said loops adjacent said bottom and cooperating with said air pressure supporting means to support said formed loops in said cabinet.

8. A web storing device comprising, in combination, a cabinet into which the web is fed and withdrawn, said cabinet being formed with a web inlet adjacent the top thereof and a web outlet adjacent the bottom thereof, fluid means adjacent the inlet for forming the fed-in web into loops adjacent the top of said cabinet, fluid means for supporting said loops in said cabinet while the web is being withdrawn through said outlet, at least one of said fluid means being adapted to be rendered inoperative, and mechanical means movable automatically into web supporting relation when said fluid supporting means become inoperative.

9. A web storing device comprising, in combination, a cabinet into which the web is fed and withdrawn, said cabinet being formed with a web inlet adjacent the top thereof and a web outlet adjacent the bottom thereof, fluid means adjacent the inlet for forming the fed-in web into loops adjacent the top of said cabinet, fluid means for supporting said loops in said cabinet while the web is being withdrawn through said outlet, at least one of said fluid means being adapted to be rendered inoperative, a series of pressure pads movable into web supporting relation when said fluid supporting means become inoperative, and means for moving said pads.

10. A web storing device comprising, in combination, a cabinet into which the web is fed and withdrawn, said cabinet being formed with a web inlet and a separate web outlet, pneumatic means engaging said web as the latter is fed through said inlet to form said web into a series of overlying loops adjacent said inlet, pneumatic means for supporting said formed loops throughout the greater portion of said cabinet, means for supplying a humidifying means to said pneumatic supporting means, and mechanical means for supporting the lower loops and cooperating with said pneumatic supporting means to support said loops in said cabinet.

11. A web storing device comprising, in combination, a cabinet into which the web is fed and withdrawn, said cabinet being formed with a web inlet and a separate web outlet, pneumatic means engaging said web as the latter is fed through said inlet to form said web into a series of overlying loops adjacent said inlet, pneumatic means for supporting said formed loops throughout the greater portion of said cabinet, means for supplying a humidifying means to said pneumatic supporting means, mechanical means for supporting the lower loops and cooperating with said pneumatic supporting means to support said loops in said cabinet, at least one of said pneumatic means being adapted to be rendered inoperative, and mechanical supporting means movable automatically to web supporting relation to replace said pneumatic supporting means to support said formed loops.

12. A web storing device comprising, in combination, a cabinet into which the web is fed and from which the web is withdrawn, said cabinet being formed with a web inlet and a web outlet, moving air means adjacent said inlet for forming said web into loops as it is fed into said cabinet, endless belt means in said cabinet both for supporting said formed loop in said cabinet and for moving the formed loops in said cabinet toward said outlet, drive means for said belt means, and auxiliary loop supporting means cooperating with said belt means to support said formed loops.

13. A web storing device comprising, in combination, a cabinet into which the web is fed and from which the web is withdrawn, said cabinet being formed with a web inlet and a web outlet, means adjacent said inlet for forming said web into loops as it is fed into said cabinet, endless belt means in said cabinet both for supporting said formed loop in said cabinet and for moving the formed loops in said cabinet toward said outlet, drive means for said belt means, auxiliary loop supporting means directly engaged by said loops and cooperating with said belt means to support said formed loops, and means controlled by said auxiliary supporting means for controlling said drive means.

References Cited in the file of this patent

UNITED STATES PATENTS

| | | |
|---|---|---|
| 661,295 | Rigamonti | Nov. 6, 1900 |
| 743,419 | Armat | Nov. 10, 1903 |
| 940,933 | Klein | Nov. 23, 1909 |
| 1,161,346 | Schmidt | Nov. 23, 1915 |
| 1,296,476 | Burnett | Mar. 4, 1919 |
| 1,399,504 | McCullough | Dec. 6, 1921 |
| 1,762,934 | Seel | June 10, 1930 |
| 1,825,142 | Bruno | Sept. 29, 1931 |
| 1,883,987 | Lasowsky | Oct. 25, 1932 |
| 2,180,601 | Mitchell et al. | Nov. 21, 1939 |
| 2,521,440 | Bannon | Sept. 5, 1950 |
| 2,563,893 | Waller et al. | Aug. 14, 1951 |
| 2,608,778 | O'Gorman | Sept. 2, 1952 |

FOREIGN PATENTS

| | | |
|---|---|---|
| 19,148 | Great Britain | Feb. 9, 1911 |
| 27,240 | Great Britain | Nov. 12, 1903 |
| 613,471 | Great Britain | Nov. 29, 1948 |
| 599,027 | France | Oct. 12, 1925 |